Dec. 16, 1924.

S. R. WARREN

PULLEY THIMBLE

Filed Feb. 2, 1923

1,519,520

INVENTOR
BY S. R. Warren
Robert N Young. ATTORNEY

Patented Dec. 16, 1924.

1,519,520

UNITED STATES PATENT OFFICE.

STEPHEN R. WARREN, OF AKRON, OHIO.

PULLEY THIMBLE.

Application filed February 2, 1923. Serial No. 616,611.

*To all whom it may concern:*

Be it known that I, STEPHEN R. WARREN, a citizen of the United States, residing at Akron, in the county of Summit and State of Ohio, have invented certain new and useful Improvements in Pulley Thimbles, of which the following is a specification.

This invention relates to pulleys which are used on constructions such as lighter than air craft where the pulley is in contact with a surface of the same.

One object of my invention is to provide a unitary shield and pulley in a compact form. A second object is to provide a sheave or pulley in a housing structure in such a manner that the point of application of the load is on the axis of the pulley.

Further objects will be more fully set forth in the annexed specification and claim.

Figure 1:
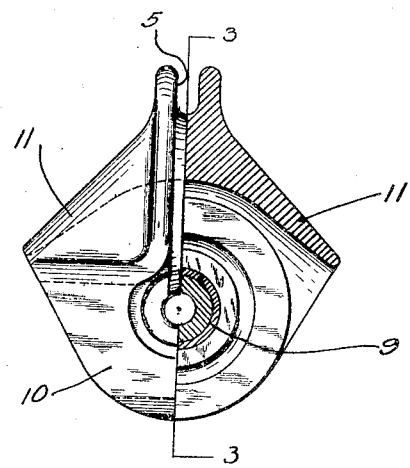
Fig. 1 is a front elevation of my device, half in section.
Figure 2:
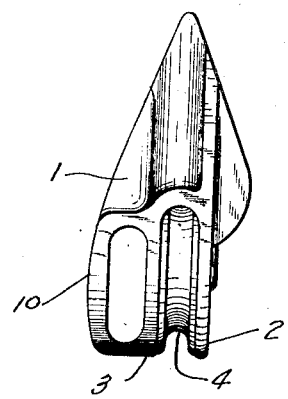
Fig. 2 is a side elevation.
Figure 3:
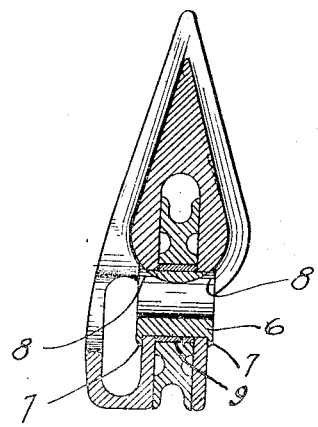
Fig. 3 is a section on line 3—3 of Fig. 1.

Referring to the drawings, 1 represents the body portion of the combined pulley and thimble which is bifurcated to provide side pieces 2 and 3, between which is mounted the wheel 4. The upper part of the body is provided with a groove 5 starting at the top of the same and extending down to form a thimble or grommet for the supporting rope or cable, which passes around this groove and through the hollow wheel supporting shaft 6. This shaft is passed through the holes in the pulley wheel and the sides 2 and 3 and is then peened over at 7 and filed out at 8 in continuation of the groove 5. This shaft rotatably supports the bushing 9 which is forced into the pulley wheel 4.

Integrally formed on the side 3 of the pulley is a chafing plate 10 which merges with the sides of the groove 5 and protects the surface against which the pulley is placed from any chafing which may otherwise be caused by the rough surfaces of the ropes or cables. This device is particularly adaptable for use in lighter than air craft construction as the chafing plate in contacting with the side of the balloon will protect the same at all times. The side continuations 11, 11, of the body portion of part 1 form a shield for the rope passing around the pulley wheel and at the same time serves to help maintain the device with the chafing plate lying flat against the adjacent surface of the construction it is mounted upon.

I claim:

In a combined pulley and cable thimble, a pulley wheel, a hollow shaft rotatably mounting the same, a bifurcated support for said shaft, one leg of the bifurcation provided with a substantially flat surface spaced from the pulley wheel end of said bifurcated support adapted to contact with an external body to prevent chafing, said support at its upper part providing a curved groove which registers with the hole in said hollow shaft to provide an unbroken surface serving as a cable thimble.

In testimony whereof I affix my signature.

STEPHEN R. WARREN.